United States Patent
Huffman

(10) Patent No.: US 7,101,457 B1
(45) Date of Patent: Sep. 5, 2006

(54) METHOD AND TOOL SYSTEM FOR PLASTIC PIPE REPAIR

(76) Inventor: James W. Huffman, 12201 N. Griffin Rd., Prosser, WA (US) 99350

(*) Notice: Subject to any disclaimer, the term of this patent is extended or adjusted under 35 U.S.C. 154(b) by 178 days.

(21) Appl. No.: 10/804,999

(22) Filed: Mar. 22, 2004

(51) Int. Cl.
*B32B 35/00* (2006.01)

(52) U.S. Cl. .................. 156/344; 156/98; 156/584; 29/426.4; 29/426.5; 285/41; 432/224

(58) Field of Classification Search .............. 156/94, 156/98, 344, 584; 29/426.4, 426.5; 285/41; 432/224
See application file for complete search history.

(56) References Cited

U.S. PATENT DOCUMENTS

| 3,246,393 A | * | 4/1966 | Worth | 29/890.144 |
| 3,906,612 A | * | 9/1975 | Tupy | 156/1 |
| 4,235,259 A | * | 11/1980 | Hudock | 138/97 |
| 4,893,393 A | * | 1/1990 | Marshall | 29/237 |
| 6,033,213 A | * | 3/2000 | Halvorsen, Jr. | 432/225 |
| 6,394,501 B1 | * | 5/2002 | Bryant, III | 285/21.1 |

* cited by examiner

*Primary Examiner*—Mark A. Osele

(57) ABSTRACT

A repair method for a plastic pipe network allows a damaged pipe to be disconnected from a fixture carrying it in the network without damage to or removal of the fixture carrying the pipe to be removed or the disruption of connections of other pipes connected to that fixture. The tool system used with my method provides a heating tool having an elongate heating head powered by an electrical powering source for insertion in the channel of the end portion of a thermoplastic pipe adhered in a thermoplastic fixture for removal without damage to the fixture. The tool system further provides a pipe removal tool having adjacently spaced prongs to be twisted about the periphery of a heated pipe portion for removal from the fixture at a temperature that causes no damage the fixture.

3 Claims, 4 Drawing Sheets

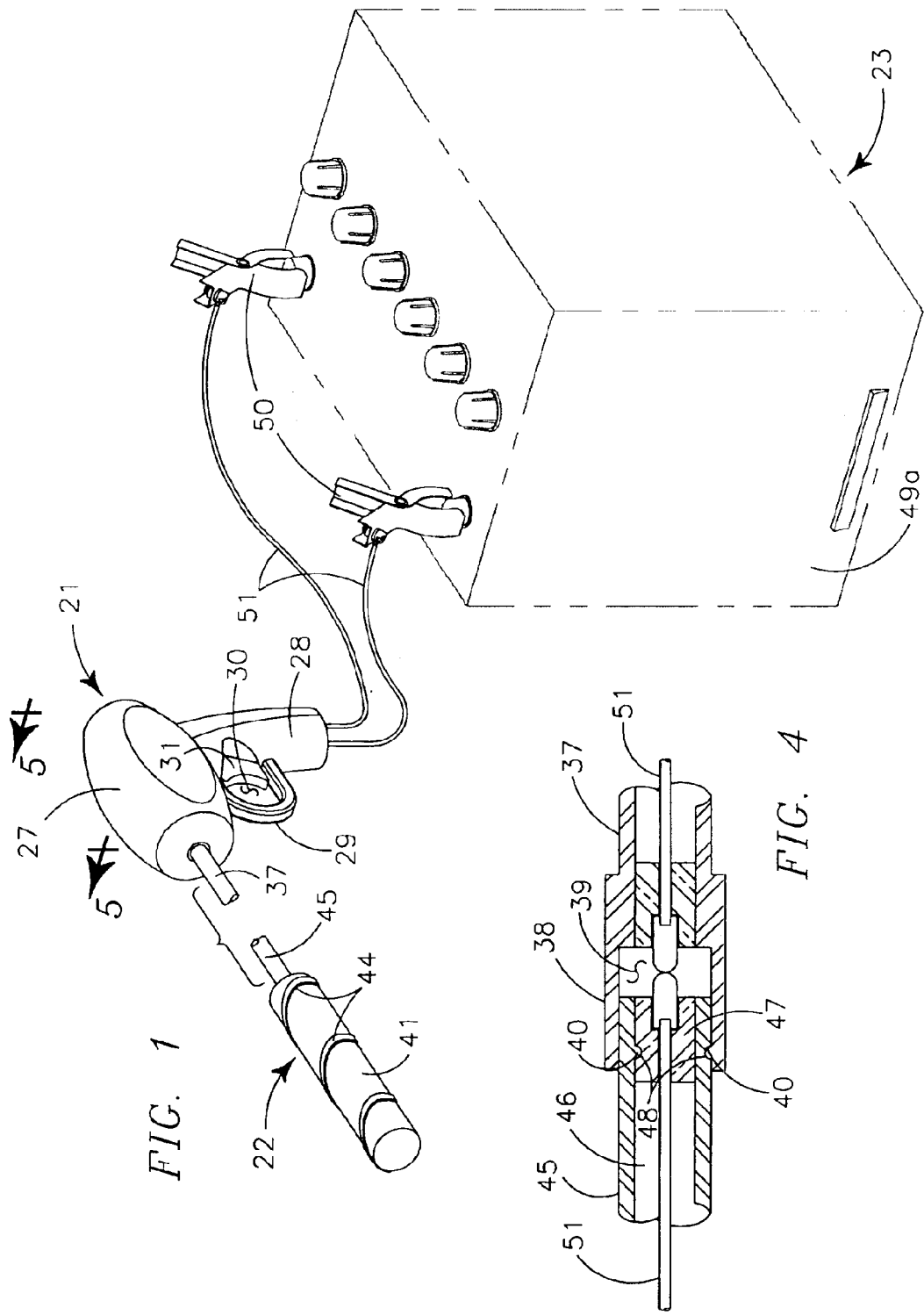

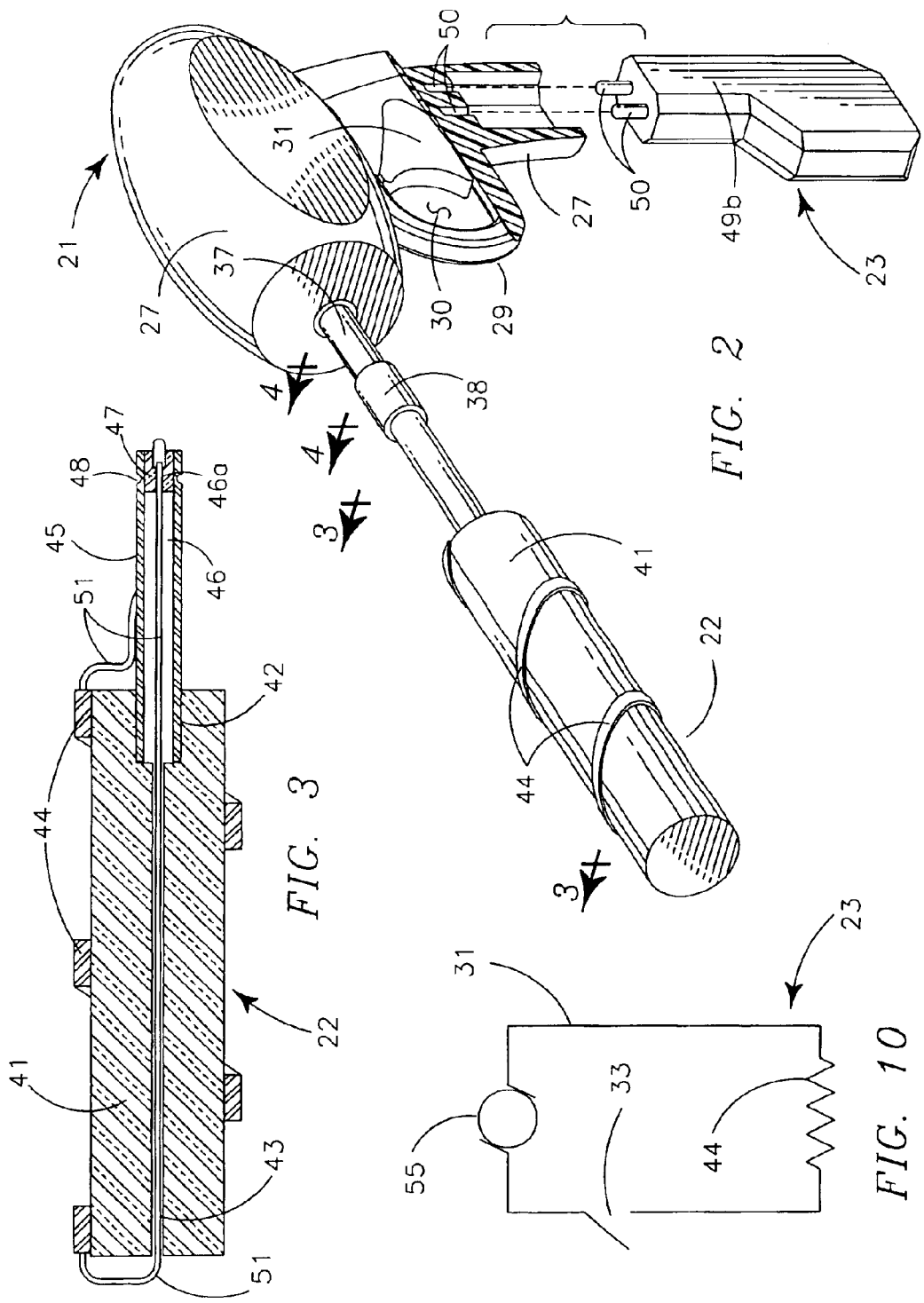

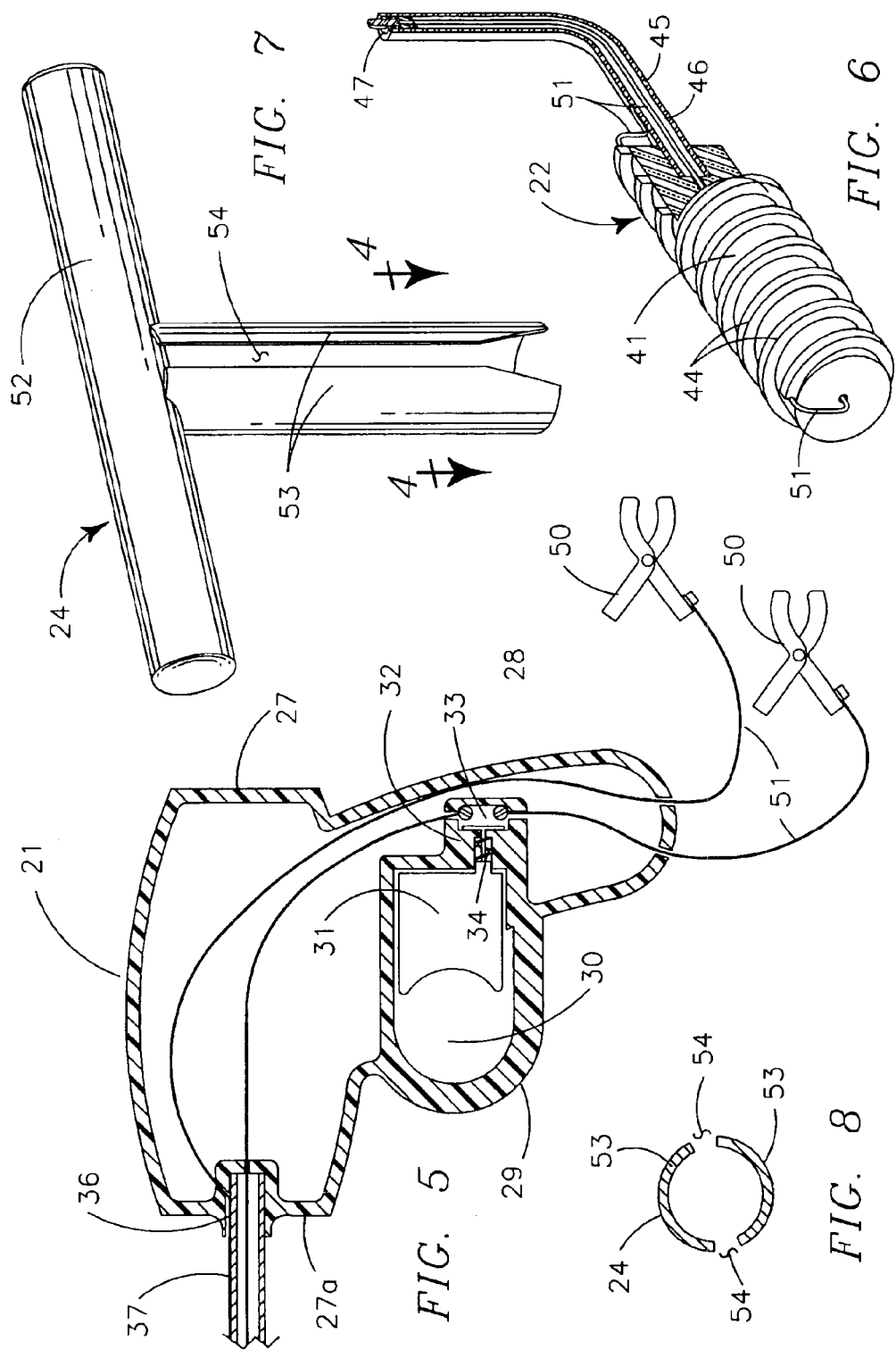

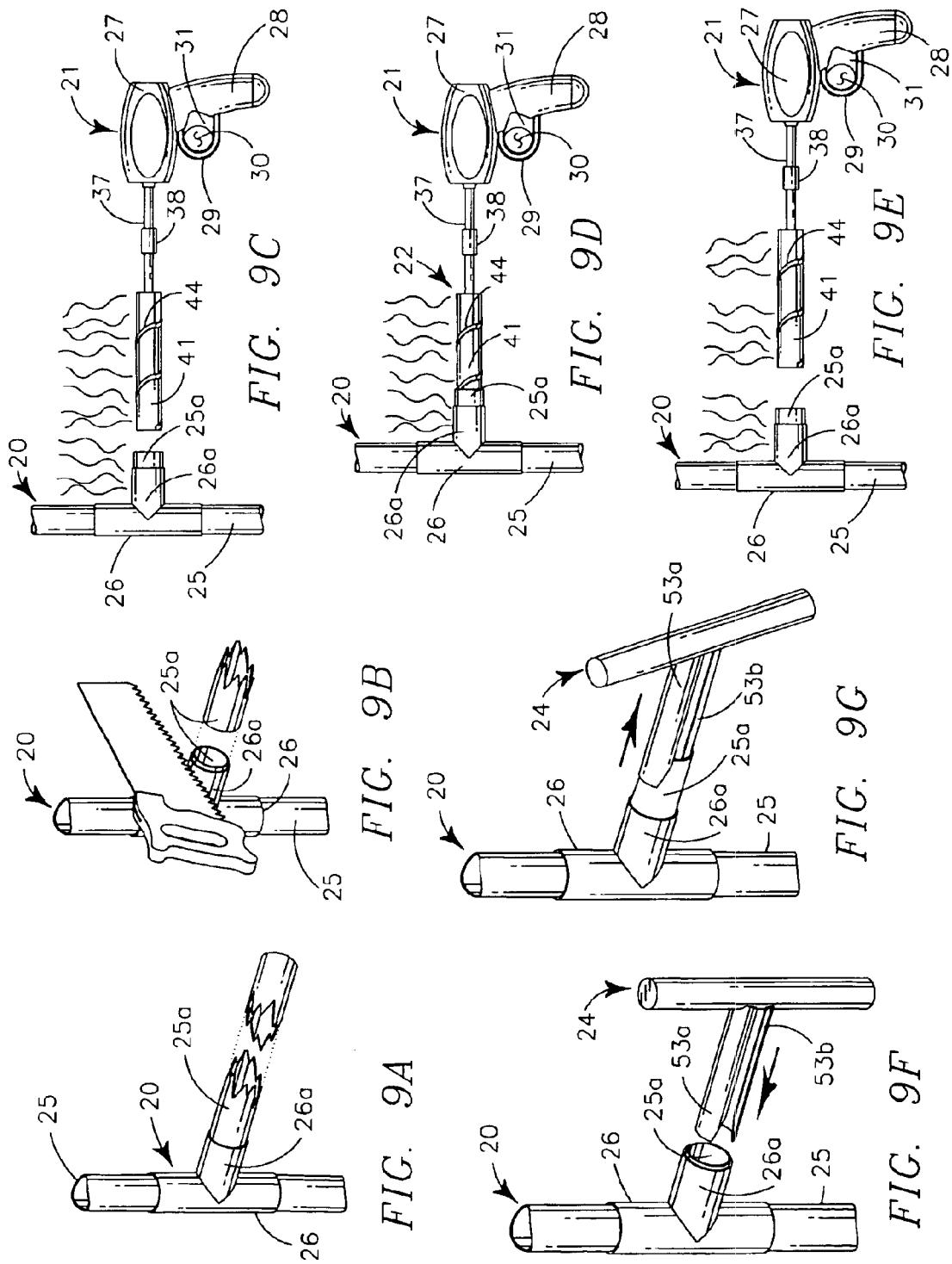

METHOD AND TOOL SYSTEM FOR PLASTIC PIPE REPAIR

BACKGROUND OF INVENTION

1. Related Applications

There are no applications related hereto heretofore filed in this or any foreign country.

2. Field of Invention

My invention relates generally to repairing pipe in tubular conduit networks and more particularly to the heating of thermoplastic pipe adhesively carried in a polymeric fixture for removal of the pipe without damaging the fixture such as to prevent future reuse.

BACKGROUND AND DESCRIPTION OF PRIOR ART

Plastic pipe since its advent had been increasingly used in fluid conducting structures and networks until in the present day it has replaced metal pipe in numerous applications. Plastic pipe by reason of the nature of the material of its formation has been used with new and different fixtures than threaded metal pipe for interconnection in fluid conducting networks as it generally is not well or simply adapted to attachment by threaded type interconnections. By reason of this historicity and to fulfill practicality requirements, plastic pipe generally has been interconnected with and serviced by unthreaded plastic fixtures that are of the same or similar essential configuration as traditional threaded metallic fixtures historically used for the threaded interconnection of metal pipes. Plastic fixtures have generally evolved with pipe receiving ports having smooth cylindrical inner surfaces of slightly greater internal diameter than the external diameter of pipes to be received therein for joinder and the interconnected pipe generally is maintained in a fluid impervious seal in such fixture ports by a relatively thin layer of adhesive material between the adjacent surfaces of the pipe and fixture to be joined. This type of plastic fluid transmitting network has gained such popularity, reliability and acceptance that it now is approved for use in many structures regulated under building codes and is used extensively in non-regulated fluid network systems generally in the modern day, to an extent possibly greater than metal pipe.

Much if not most of the plastic pipe in present day use is formed of thermally active plastic material, quite commonly polyvinyl chloride (PVC) created by an extrusion process. The fixtures joining such pipe in a fluid transmitting network also are commonly formed of thermally active plastic material, though by a molding process rather than an extrusion process, and such fixture materials are commonly of a harder more dense nature with less if any softeners and with higher vicat points. Material commonly used for joining these pipes and fixtures is a quickly setting thermally active polymeric material that bonds to both adjacent surfaces being joined by reason of thermal or chemical activity or both that occurs in a relatively thin layer beneath the adjacent surfaces of the material forming the elements being joined.

It often is necessary in existing plastic pipe networks to make changes, modifications, corrections and repairs. This activity has presented problems which heretofore have been considered but not completely and satisfactorily resolved. In general when the end of a plastic pipe has had to be removed from an adhesively joined fixture, the fixture has been cut out of the existing network, removed, and replaced with a new fixture. This usually has required the lengthening of most or all pipes interconnected with the replacement fixture by using additional lengths of pipe and connecting sleeves which results in the use of more fixtures in the system with resultant higher costs, higher probability of future maintenance problems and the expenditure of more workman time in reconnecting the pipes and fixtures. The instant invention allows the end portion of the pipe that is to be removed to make a repair to be removed, while salvaging the fixture and the interconnections of other pipes connected to the fixture for continued use, so that only the replacement for the removed pipe need be reconnected in the pre-existing fixture fluid transmitting network after repair.

In general historically it appears that it has not been considered possible or practical to use thermal means to release an adhered joint once established between thermal plastic pipe and a thermoplastic fixture in a fluid conducting network. The inventor has found, however, with many thermally active plastics and commonly used adhesives that with adequate control of temperatures and the amount of thermal work done, thermoplastic pipes can be effectively removed from thermoplastic fixtures without damaging the fixtures to prevent future use. Particularly, flexible PVC pipe when used with common commercially available adhesives and polymeric fixtures, may be cut near a fixture interconnecting it and the end portion of the pipe in the fixture heated from the inside to a point near its vicat temperature, such that the pipe is still coherent and somewhat configurationally self sustaining, and the adhesive cementing it to the fixture, or at least the adjacent surface areas of the adhesive and pipe, have softened sufficiently to allow release of the adhesive bond. The pipe then may be engaged by a particular disclosed two-tined tool and twisted sufficiently about the pipe axis to release the adhesive bond at a temperature at or somewhat below the vicat point of common PVC pipe. With such adhesives the softening temperature need not be exceeded, though the heat applied should not be applied for any longer period of time than necessary. If heat is applied to a PVC pipe joined in a fixture port at temperatures near the vicat point of the pipe for lengthy period, the heated PVC pipe may become sufficiently softened as to allow excessive stretching or to lose its coherence, either of which may prevent or hinder extraction of the pipe from the interconnecting fixture port.

The vicat softening temperatures of polyvinyl type plastics used in smaller flexible extruded pipe of modern day commerce vary somewhat, depending on the specific composition of the plastic and the nature of its polymerization, but generally range between approximately 220° to 260° Fahrenheit. The temperature of the polyvinyl pipe in a fixture must be somewhat regulated as the slump temperature at which PVC pipes lose their configurational stability generally is not too far above their vicat temperatures. The vicat point of a particular pipe may be estimated empirically by practical experience, as aided by some thermal measuring device or by use of my extraction tool herein disclosed for the material of formation of the particular pipe.

The transmissability of heat by PVC is such as to give some range for the amount of heat work that may be input to allow removal of PVC pipe from a fixture. The appropriate temperature and its application time may be empirically determined fairly readily by use of the instant extraction tool. The tool will not extract PVC pipe until the interface of adhesive and adjacent pipe surfaces is sufficiently softened to release the adhesive bond. Use of the tool also determines if and when PVC pipe is sufficiently above its vicat point to lose its configurational stability or stretch sufficiently to lose its coherence to prevent pulling.

My invention does not reside in any one of these features individually, but rather in the synergistic combination of all of its structures and methods which give rise to its functions, as hereinafter claimed.

DESCRIPTION OF PRIOR ART

Mohr, U.S. Pat. No. 2,429,888, shows a thermal method of debonding parts in a fluidic distribution system that have been soldered together. In such debonding both the pipe and fixture involved become pliable, if at all, at very substantially higher temperatures than the liquefying temperature of the bonding solder. U.S. Pat. No. 3,246,393, discloses a method for removing a hose from a metallic fixture while salvaging the fixture which involves heating the fixture to a temperature high enough to soften the plastic hose carried therein to allow removal. Here the fixture is heated rather than the hose and the metal fixture would not be damaged at temperatures that would destroy the attached hose. Tupy, U.S. Pat. No. 3,906,612, shows a metallic cylinder having an internal baffle to allow heating by an external gas flame, provided by a separate tool, for internal placement in a thermoplastic pipe for removal from a fixture. The flame heating of the Tupy tool is substantially different from the electrically powered heating of the instant tool and would not provide the benefits of electrically powered heating.

SUMMARY OF INVENTION

My tool system for repair of plastic pipe networks comprises a heating tool, an electrical powering source and a pipe removal tool. The heating tool provides a body with a handle to aid manual manipulation and an elongate connecting rod extending forwardly from the body to releasably interconnect a heating head spacedly distant from the body. The connecting portions of either the heating tool or the heating head may have the upward end part bent to extend angularly, normally perpendicularly, to the portion joining the heating tool or heating head respectively so that the axis of the cylindrical heating head may be perpendicular to the axis of the connecting element of the heating tool which may make use of the tool easier with some pipe network configurations. Heating tool electrical circuitry having switching means communicates from a battery type electrical powering source through the body and heating head support to the outer end of the heating head support which releasably interconnects the heating head in electrical communication with the heating tool electrical circuitry communicating with the powering source. The heating head provides a cylindrical body having means for supportive and electrical interconnection with the forward portion of the heating tool connecting rod and carries an electrically powered resistive heating element for electrical interconnection with the heating tool electric circuitry. The heating head has an external diameter slightly less than the internal diameter of a pipe to be removed from a fixture but great enough to be in close proximity to the internal surface of a pipe to be removed when inserted therein to aid somewhat uniform heat transfer between the heating head and the pipe to be removed thereby. The electrical powering system provides the source of electric energy that communicates through the heating tool electrical circuitry to the resistive heating element of the heating head to generate heat in and about the heating head. The source of the electric energy preferably is a battery either associated with the tool body or releasably separate therefrom and electronically interconnected therewith.

The pipe removal tool is a T-shaped structure having an elongate handle structurally supporting a medial normally extending relatively thin pipe extraction element comprising a circularly cylindrical tube having diametrically opposed axially aligned slots extending at least through the axially outer end portion of its circumferential surface. The pipe extraction element has an external diameter slightly less than the internal diameter of a port from which a pipe is to be removed and a tapered outer end portion with rounded outer corners to aid insertion about a heated pipe and within the channel of a fixture port carrying it.

To use my tool system a pipe in an interconnected fluid conducting system that is desired to be removed from a fixture is severed spacedly outwardly of the port of the fixture carrying it. The heating tool with heating head and powering source attached is then manually manipulated to insert the heating head within the channel of the portion of the pipe to be removed that is carried within the port of the interconnecting fixture and the heating tool switch is activated to provide electrical power to the resistive element of the heating head to cause heating therein and thereabout. The heating tool is left in this heating position a predetermined period of time empirically determined from prior work with the same or similar materials or is removed periodically to test with the pipe removal tool. To test the pipe portion of the fixture for sufficient heating for removal, the extraction element of the removal tool is manually manipulated to extend one slit portion about the heated pipe and within the channel of the fixture carrying the pipe. If the pipe is not hot enough for removal the removal tool will not pass between the pipe and fixture port carrying it. If the pipe to be removed is deformable the removal tool is inserted within the fixture port with one slit portion of its extraction cylinder on the outside of the pipe to be removed and the other slit portion in the inside of the pipe and the tool twisted sufficiently about the extraction element axis to deform the heated pipe to be removed so that it grasped by the pipe extraction element and may be pulled from the fixture port carrying it is by the removal tool. At this point the fixture port that carried the removed pipe will not be heated sufficiently to be configurationally deformed and may be reused in the future to receive and interconnect the end portion of a repair pipe.

In creating such a tool system and process it is:

A principal object to provide a tool system to aid a process for removal of a short length of thermal plastic pipe from a thermal plastic fixture without damaging the fixture to prevent future reuse.

A further object is to provide such a tool system having a heating tool with interchangeable heating heads that may extend either elongately from the heating tool or perpendicularly therefrom for ease of use.

It is a further object is to provide a heating head for such a heating tool that is powered by a portable battery either releasably carried by the heating tool or separate therefrom and communicating therewith by wired interconnection.

A further object is to provide such a heating head that is insertable within the channel defined by a pipe portion to be removed from a fixture to provide heat in the channel of the portion of the pipe carried within the fixture port.

A still further object is to provide a pipe removal tool having an elongate handle structurally carrying a medially positioned perpendicularly extending circularly cylindrical removal element having a diameter slightly less than the diameter of a fixture port from which a pipe portion is to be removed and similar diametrically opposed slits to allow passage of one slit portion between the end portion of the pipe to be removed and the fixture port carrying it and the other slit portion within the channel of the pipe to be removed.

A still further object is to provide such a tool that may be inserted in and about a pipe length to be removed from a fixture to determine when the pipe to be removed has reached a temperature to allow deformation and release of adhesive bonding with the fixture port for subsequent removal by twisting of the tool relative to engage the pipe and allow pulling type removal from the fixture.

A still further object is to provide a method for using such a tool system that allows a thermal plastic pipe in a fluid conducting network to be severed spacedly adjacent the port of an interconnecting fixture for subsequent heating of the pipe length within the fixture that disrupts an adhesive bond between the pipe length and fixture to allow removal of the pipe length in an axial direction from the fixture without damaging the fixture to prevent such a reuse.

A still further object is to provide such a tool system and process that are of new and novel design, of rugged and durable nature, of simple and economic manufacture and use and that are otherwise well suited to the uses and purposes for which they are intended.

Other and further objects of my invention will appear from the following specification and accompanying drawings which form a part hereof. In carrying out the objects of my invention, however, it is to be understood that its features are susceptible to change in design and arrangement with only one preferred and practical embodiment being illustrated in the accompanying drawings and specified as is required.

BRIEF DESCRIPTION OF DRAWINGS

In the accompanying drawings which form a part hereof and wherein like numbers of reference refer to similar parts throughout:

FIG. 1 is an isometric view of a heating tool of my system powered by a distal battery.

FIG. 2 is a partially cutaway isometric view of a heating tool of my system powered by a removable battery carried directly by the heating tool.

FIG. 3 is an enlarged vertical elongate cross-sectional view through the heating head of the heating tool of FIG. 2, taken on the line 3—3 thereon in the direction indicated by the arrows.

FIG. 4 is somewhat enlarged vertical cross-sectional view through the connecting structure that releasably interconnects the heating head with the heating tool, taken on the line 4—4 on FIG. 2 in the direction indicated by the arrows thereon.

FIG. 5 is a vertical medial cross-sectional view through the body of the heating tool by FIG. 1, taken on the line 5—5 thereon in the direction indicated by the arrows.

FIG. 6 is a partially cut-away isometric view of a heating head that extends perpendicularly from the heating tool rather than elongately.

FIG. 7 is an isometric view of the pipe removal tool of the tool system.

FIG. 8 is a horizontal cross-sectional view through the pipe extraction element of the pipe removal tool of FIG. 7, taken on the line 8—8 thereon in the direction indicated by the arrows.

FIGS. 9A–9G are semi-diagrammatic illustration of various steps involved in the instant method for removal of a length of pipe from the port of a fixture carrying it.

FIG. 10 is an electrical diagram in normal symbology showing use of an alternating current source of electric energy.

DESCRIPTION OF THE PREFERRED EMBODIMENT

My tool system provides generally heating tool 21 having heating head 22 interconnected with powering system 23 and pipe removal tool 24 to remove a length of pipe from a carrying fixture in pipe network 20.

Pipe network 20 is comprised of a plurality of thermal plastic pipes 25 interconnected by a plurality of fixtures 26, only a portion of which is illustrated in FIGS. 9A–9E. Normally in thermal plastic pipe networks the interconnecting fixtures 26 are also formed of thermal plastic material. Generally the parts of such distribution network are supported in or on various structures that are immovable relative to each other so that if it is desired to modify, change or repair the network a pipe 25 must be cut to allow such activity and subsequently be re-established in the network. Commonly in the past when pipe modification in a network has been accomplished a pipe has been cut where a new component is to be installed or a repair made and to re-establish the network a new fixture is installed to interconnect both of the cut pipe ends into the network or, in the case of a required removal of a fixture, all pipes interconnected thereto will be cut and reconnected into the system with a new replacement fixture and at least one additional fixture for each cut pipe. The instant repair method allows a damaged pipe 25a to be cut at or near a fixture port and the portion of the pipe remaining in the fixture port subsequently removed without damage to that fixture port that would prevent re-use to allow establishment of the fluid system by use of only one additional fixture rather than two or more additional fixtures heretofore required.

My heating tool shown in FIG. 1 provides elongate peripherally defined body 27 structurally interconnecting depending peripherally defined handle 28. The forward juncture of body 27 and handle 28 defines trigger guard 29 defining trigger orifice 30 to internal rearward projection 32 of trigger guard 29 carries movably trigger 31 mounts on/off switch 33 changes states responsive to motion of trigger 31. Trigger 31 is bias to a forward position by compression spring 34 which maintains switch 33 in a null off mode unless the bias of trigger 31 is removed by pulling the trigger rearwardly to bring switch 33 into its on mode. A latch or other known mechanism (not shown) may be provided if desired to maintain switch 33 in an on mode until reactivation of trigger 31 after establishment of the on mode.

The forward face 27a of body 27 defines rearwardly extending fastening arm cup 35 which defines channel 36 to receive the rearward end portion of heating head mounting arm 37. The heating head mounting arm 37 is structurally carried in channel 36 of fastening arm cup structure 35 and extends forwardly a spaced distance therefrom to terminate in releasable connecting structure, as seen in FIG. 4. The forward portion of heating head mounting arm 37 structurally defines tubular connector 38 extending forwardly therefrom and defining heating head connector arm 45 connecting channel 39. Spacedly inwardly of its forward end tubular connector 38 defines radially inwardly extending fastening protuberances 40 to releasably maintain the heating head connector arm 45 therein.

Heating head 22 as shown in FIGS. 2 and 3 provides forward cylindrical body 41 formed of some rigid material, preferably of an electrically insulative nature and having reasonably high heat conductivity to maintain and stabilize the temperature of the heating head somewhat uniformly throughout. The rearward portion of the body 41 defines axially aligned connecting arm chamber 42 communicating with somewhat radially smaller axially aligned heating wire channel 43 extending forwardly through the forward end of body 41. The radially outer surface of body 41 supports a heating element 44, in the instance illustrated comprising a spirally wound electrically resistive element. The overall diameter of the heating head 22 with heating element 44 in place thereon must be slightly less than the internal diameter of a pipe in which the heating tool 24 is to be used.

Heating head connecting arm 45 is an elongate tubular element defining internal channel 46 which is closed at its rearward end by plug 47 which defines a medial axially aligned channel 46a to allow passage of an electrically conductive powering wire therethrough. The heating head connecting arm 45, forwardly adjacent its rearward end portion and radially outwardly of plug 47, defines spaced annular fastening grooves 48 to receive fastening protuberances 40 defined in the inner surface of tubular connector 38 of heating head mounting arm 37 of body 27. The external diameter of the rearward end portion of the heating head connecting arm 45 is such as to slidably fit within connecting channel 39 of tubular connector 38 and be there releasably maintained by interconnection of fastening protuberances 40 of the tubular connector 38 when positioned within annular fastening grooves 48. To allow this interconnection the interconnected portions of the heating head connecting arm 45, tubular connector 38 or both must be sufficiently resilient with appropriate retentent memory to allow their interconnection or if not, circumferentially spaced axially aligned channels (not shown) need be defined in the radial outer portion of heating head connecting arm 45 extending rearwardly from each annular fastener groove 48 to the rearward end of the connecting arm 45. With such previously known type of interconnection the heating head connecting arm 45 may be rotated sightly relative to the heating head mounting arm 37 to releasably fasten fastening protuberances 40 in fastening grooves 48.

Powering system 23 provides a direct current source 49 in the instance illustrated in FIG. 1 comprising an ordinary automotive battery 49a and in the instance illustrated in FIG. 2 comprising an ordinary hand tool battery 49b. As seen particularly in FIG. 5, electric current passes from battery connectors 50 through wire connectors 51 to interconnect on/off switch 33 and heating element 44 in an electrical series type communication with each other so that the switch 33 controls power input from direct current source 49a to heating element 44. As seen in FIG. 2 battery 49b releasably interconnects by known standard connectors 50 partially carried in tool handle 28. The powering system may also use an alternating current source 55 to energize the heating element 44 as illustrated in FIG. 10, if such a source is conveniently available in or about the area of pipe repair.

Pipe removal tool 24 as seen in FIGS. 7 and 8 comprises rigid elongate cylindrical handle 52 structurally carrying in its medial portion perpendicularly extending pipe extraction element 53. Handle 52 is circularly cylindrical element that may be solidly or peripherally formed and if peripherally formed preferably has enclosed ends to prevent debris entrance and maintenance in the channel. The pipe extraction element 24 is a circularly cylindrical tube having two diametrically opposed elongate slots 54 defined in its circumferential surface and extending from the outer end distal from handle 52 to a point spacedly adjacent to the handle 52. The outer end corners defining slots 54 preferably are filleted and the outer edges of the pipe extraction element are tapered to a thin edge to allow easier entry of a split portion of the extraction element within a pipe to be removed and the other split element 53 to be inserted between a pipe to be removed and a portion of the fixture defining the port carrying the pipe to be removed.

Having described the structure of the tools of my system, the method of use of those system tools and resultant pipe removal process may be understood.

A portion of a fluid transmission system is shown in FIG. 9A where it is seen have one pipe portions 25 and damaged pipe portion 25a interconnected by T-type fixture 26. To remove the damaged pipe section 25a, that section is exposed from surrounding structures or earth to allow access and the damaged pipe portion 25a is severed spacedly outwardly of the port 26a of fixture 26 carrying the damaged pipe 25a at a position such that the length of the damaged pipe remaining in the fixture port 26a is somewhat less than the overall axial length of the body 41 of heating head 22, as illustrated in FIG. 9B.

As seen in FIG. 9C heating tool 21 then is assembled with a heating head 22, of either straightened or angulated configuration as may be appropriate for most convenient use, as illustrated in FIG. 9C. The heating tool 21 then is activated responsive to operation of trigger 31 and responsively current flows to heating element 44 to provide heat by direct transmission and radiation in body 41 and thereabout. The heating head 41 is preferably formed of some heat absorbing material that is electrically insulative, such as a ceramic or metallic ceramic, so that it might serve somewhat of a heat reservoir as seen in FIG. 9C.

After the heating head 22 has attained an appropriate temperature, normally determined imperially from past experience with similar plastic pipes, fixtures and adhesives, the heating head 22 is moved within the channel defined by the portion of damaged pipe 25a remaining in fixture port 26a and there maintained for a predetermined period of time, again determined imperially from prior experience with similar materials. The heat generated in heating head 41 and heating element 44 is transferred to and through the remaining pipe portion 25a to heat that pipe portion, the outer surface thereof and adhesive material carried thereabout. When the temperature of the adhesive material fastening the remaining pipe portion 25a in port 55 has softened appropriately to allow removal, heating tool 21 is manually removed from the pipe portion 25a, as illustrated in FIG. 9E.

The pipe removal tool 24 then is manipulated by its handle 52 to position one arm 53a on the outside of heated pipe portion 25a and the other pipe extractor element 53b inside the channel of pipe element 25a, as illustrated in FIG. 9F. At this point the pipe portion 25a will be softened to allow deformability which will aid the insertion of the portions of pipe extraction element 53, as indicated and shown in FIG. 9F.

After such positioning of the pipe removal tool 24, handle 28 is manually rotated somewhat to deform at least the upper end part of pipe portion 25a to deform that pipe portion somewhat to allow grasping by the pipe extraction tool 24 and the tool is moved outwardly and from away from port 26a of fixture 26 to extract the pipe portion 25a therefrom, as illustrated in FIG. 9G.

The pipe removal tool 25 serves as a measuring device to determine if the temperature of damaged pipe portion 25a and the amount of heat work preformed thereon are sufficient to allow removal of that pipe portion from fixture 26. If the tool 24 may not be inserted in the heated pipe portion 25a or may not be rotated to cause grasping engagement with the pipe portion 25a, the pipe portion is not hot enough to be extracted and further heat will need to be applied by the heating head 22 in the same fashion as it was initially applied and the removal process thereafter repeated as indicated in the first instance. The heating of pipe portion 25a should not be hot enough to cause substantial slumping of that pipe portion from its initial cylindrical configuration and should not be great enough to disrupt the coherency of the pipe portion 25a as this would prevent subsequent removal of the pipe portion by use of the pipe removal tool 24.

In this regard, it is to be remembered that the pipe portion 25a is being heated from within its medial channel and the material from which the pipe portion 25a is formed, even though it is thermally active, does not provide a transfer rapid of heat therethrough so the pipe portion will be hotter than the port 26a of the fixture 26 carrying it to provide some temperature range within which the instant removal process may be accomplished. It is further to be noted that many, if not most, of the adhesive materials used to sealably fasten thermal plastic pipe 25 in fixture 26 lose their adhesive characteristics at temperatures generally below the vicat points of either the plastic pipe or fixture and this further increases the temperature range within which my process is active. This active temperature range may be determined by a user from prior work with similar materials with very little experimentation by reason of the temperature range over which the process is operative. Preferably the amount of the electrical heating element 44 and therefore its electrical resistance is pre-determined to limit the amount of heat supplied to heating head 41 and thereabout so as to require a heating period of approximately at least two to five minutes to allow removal of pipe portion 25a from its carrying fixture to make it easier for the user to stay within the temperature window in which the instant removal process may be effectively and efficiently carried out.

After removal of pipe portion 25a from carrying fixture 26 fixture port 55 will be configurationally self sustaining and remain usable. The remaining damaged portion of pipe 25a may then be trimmed as necessary and a new portion of pipe fastened to the remaining portion of pipe 25a by a sleeve type connector (not shown) and interconnected in port 26a to repair the damaged fluid system to its original configuration by use of only one additional fixture. If such a repair were made prior to use of my process, the fixture 26 normally would have been cut out of the pipe network 20 and each of the three pipes 25 interconnected therewith would have been rejoined by use of a new fixture and additional lengths of pipe necessary to connect the original pipes 25 to the new fixture, which would have to joined to the original pipes 25 by new sleeve type connectors. This would require both a new "T" type fixture and three additional new sleeve type connectors, aside from the additional pipe that might be required.

If it is desired to insert a new fixture or subsystem into an existing pipe network, the process would be substantially the same as that described for repair of a damaged pipe. The particular pipe in which the fixture or subsystem is to be interconnected would be cut spacedly outwardly of the port of a fixture, and the new element or subsystem installed between the fixture and the cut pipe portion after removal of the cut pipe end portion adhered in the fixture port carrying it from that port.

The foregoing description of my invention is necessarily of a detailed nature so that a specific embodiment of its best known mode may be set forth as required, but it is to be understood that various modifications of detail, rearrangement, multiplication of parts and ordering of process steps might be resorted to without departing from its spirit, essence or scope.

Having thusly described my invention, what I desire to protect by Letters Patent, and

What I claim is:

1. A method for repairing a pipe network interconnecting thermal plastic pipe adhesively bonded with thermal plastic fixtures without damaging the fixtures such as to prevent reuse, comprising in combination:

severing the thermal plastic pipe to be removed from the thermal plastic fixture spacedly distant from the fixture;

placing a heating tool having an elongate cylindrical electrically powered heating head with an external diameter less than the internal diameter of the thermal plastic pipe to be removed within the portion of the thermal plastic pipe that is carried within the fixture;

supplying electric power to the heating head to cause heating therein and thereabout to release adhesive bonding between the pipe and the fixture carrying the pipe while maintaining coherence of the pipe and configurational stability of the fixture;

removing the heating head from the pipe to be removed;

inserting an external element of a pipe removal tool, having an elongate handle and a cylindrical extraction element with first and second spacedly separated portions extending perpendicularly therefrom, over the outer end portion of the damaged pipe with the first portion between the damaged pipe and a port of the fixture carrying the damaged pipe element and the second portion of the extraction element within the channel defined by the pipe; and rotating the handle of the pipe removal tool to rotate the extraction element relative to the pipe to engage the extraction element with the damaged pipe; and manually moving the pipe removal tool away from the fixture substantially along the extended axis of the pipe to remove the pipe from the fixture.

2. The method of claim 1 wherein the heating tool comprises in combination:

an elongate body having a depending handle to aid manipulation and a trigger guard extending between the handle and body, said trigger guard carrying a trigger to change the state of an off/on switch carried by the trigger guard;

a heating head mounting arm extending spacedly forwardly from the body and having a tubular connector in its forward end portion to releasably interconnect a heating head connector arm;

a heating head having an elongate body with an electrically resistant heating element carried by a circumferential surface thereof and a connector arm extending axially a spaced distance therefrom and having connecting means to releasably interconnect with the connector of the heating head mounting arm; and a powering system comprising a source of electric current communicating in series through an off/on switch to the electrically resistive heating element carried by the heating head.

3. The process of claim 1 further characterized by the pipe removal tool comprising:

an elongate rigid handle structurally carrying in its medial portion a perpendicularly extending elongate cylindrical extracting element having diametrically opposed slots, wider than the wall thickness of the pipe to be removed, and extending from the portion of the pipe extraction element distal from the handle inwardly toward the handle to a spaced distance therefrom.

* * * * *